United States Patent
Bae et al.

(10) Patent No.: US 7,627,211 B2
(45) Date of Patent: Dec. 1, 2009

(54) TUNABLE DISPERSION AND DISPERSION SLOPE COMPENSATOR IN OPTICAL TELECOMMUNICATION SYSTEM

(75) Inventors: Jun Kye Bae, Seongnam-si (KR); Young Jun Lee, Daegu (KR); Sang Hyuck Kim, Seoul (KR); Sang Bae Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 11/886,110

(22) PCT Filed: Oct. 27, 2005

(86) PCT No.: PCT/KR2005/003603

§ 371 (c)(1),
(2), (4) Date: May 7, 2008

(87) PCT Pub. No.: WO2006/095950

PCT Pub. Date: Sep. 14, 2006

(65) Prior Publication Data

US 2008/0232739 A1    Sep. 25, 2008

(30) Foreign Application Priority Data

Mar. 9, 2005  (KR) .................. 10-2005-0019862

(51) Int. Cl.
*G02B 6/34*    (2006.01)
(52) U.S. Cl. .......................... 385/37; 385/27
(58) Field of Classification Search ............ None
See application file for complete search history.

(56) References Cited

U.S. PATENT DOCUMENTS

| | | | | |
|---|---|---|---|---|
| 5,602,949 | A  * | 2/1997 | Epworth | 385/37 |
| 6,633,702 | B2 * | 10/2003 | Hoshino | 385/37 |
| 6,757,462 | B2 * | 6/2004 | Verdrager et al. | 385/37 |
| 6,788,851 | B1 * | 9/2004 | Bylander et al. | 385/37 |
| 6,847,763 | B2 * | 1/2005 | Eggleton et al. | 385/37 |
| 6,865,326 | B2 | 3/2005 | Kato | |
| 6,898,002 | B2 * | 5/2005 | Shigematsu et al. | 359/337 |

(Continued)

FOREIGN PATENT DOCUMENTS

WO      WO 02/089363      11/2002

OTHER PUBLICATIONS

J. Kwon et al. Group-delay-tailored chirped fiber Bragg gratings using a tapered elastic plate. IEEE Photonics Technology Letters, 14:10:1433-1435, Oct. 2002.*

(Continued)

*Primary Examiner*—Mike Stahl
(74) *Attorney, Agent, or Firm*—Jones Day

(57) ABSTRACT

The present invention relates to a tunable dispersion and dispersion slope compensator based on an optical fiber grating in an optical communication system. The compensator includes: a first disk having a ring shape, wherein the first disk is configured to rotate; a second disk installed at an inner space of the first disk, wherein the second disk is configured not to rotate; a metal plate configured to bend as the first disk rotates; and an optical fiber grating adhered to the metal plate, wherein the optical fiber grating has different strains according to positions when the metal plate rotates.

3 Claims, 3 Drawing Sheets

U.S. PATENT DOCUMENTS

2003/0012499 A1 * 1/2003 Mendez et al. ................ 385/37
2003/0026533 A1     2/2003 Danziger et al.
2005/0084209 A1 * 4/2005 Bae et al. ...................... 385/27

OTHER PUBLICATIONS

S. Chung et al. Group delay control of super-imposed fiber gratings using a two-column system mounted on a rotatable disk. IEEE Photonics Technology Letters, 16:1:153-155, Jan. 2004.*

* cited by examiner

[Fig. 1]
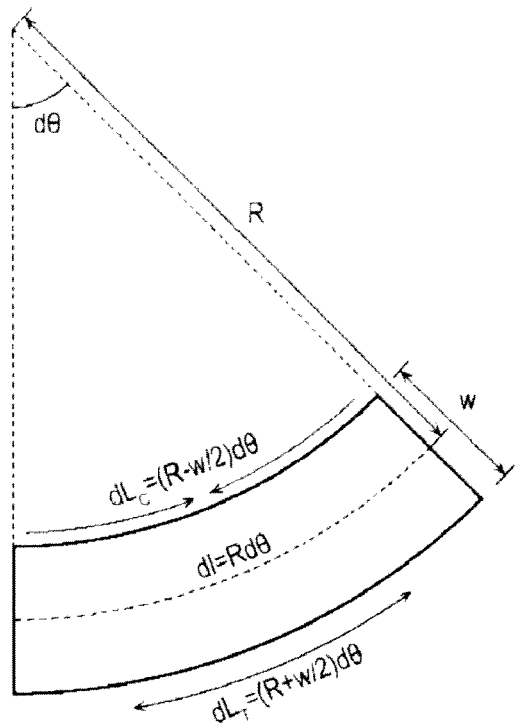
[Fig. 2]
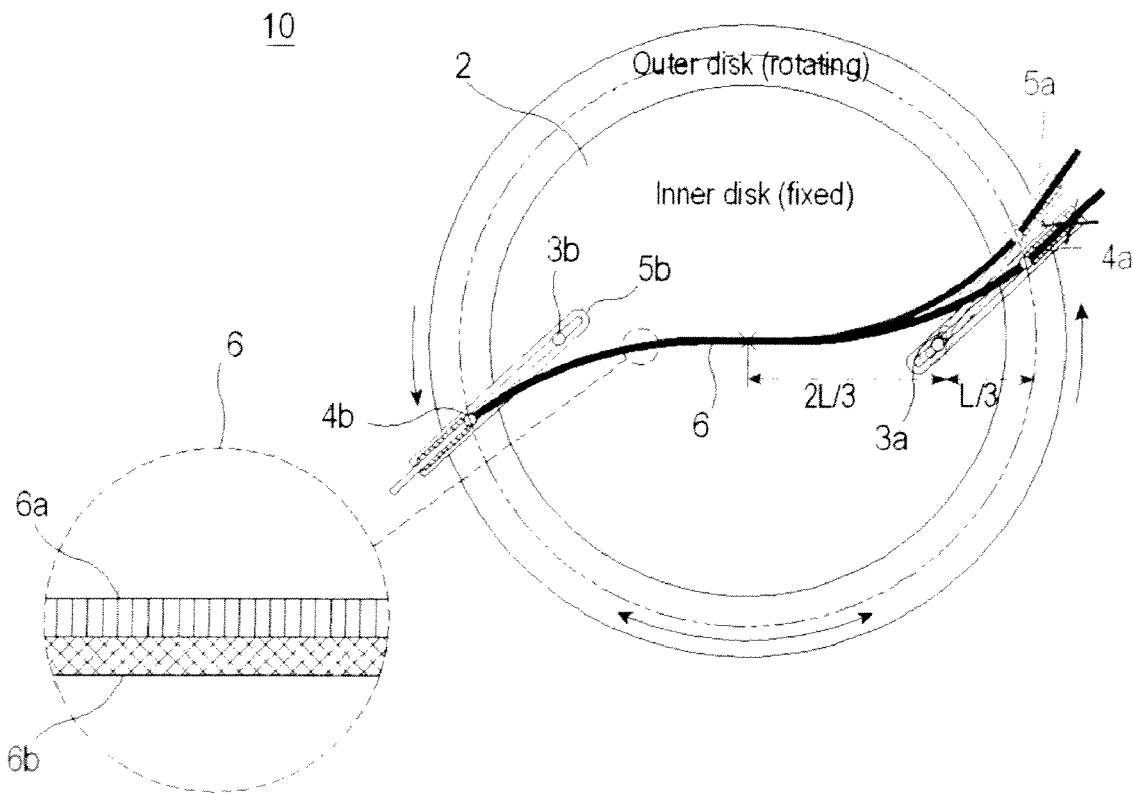

[Fig. 3]
(a)  (b)
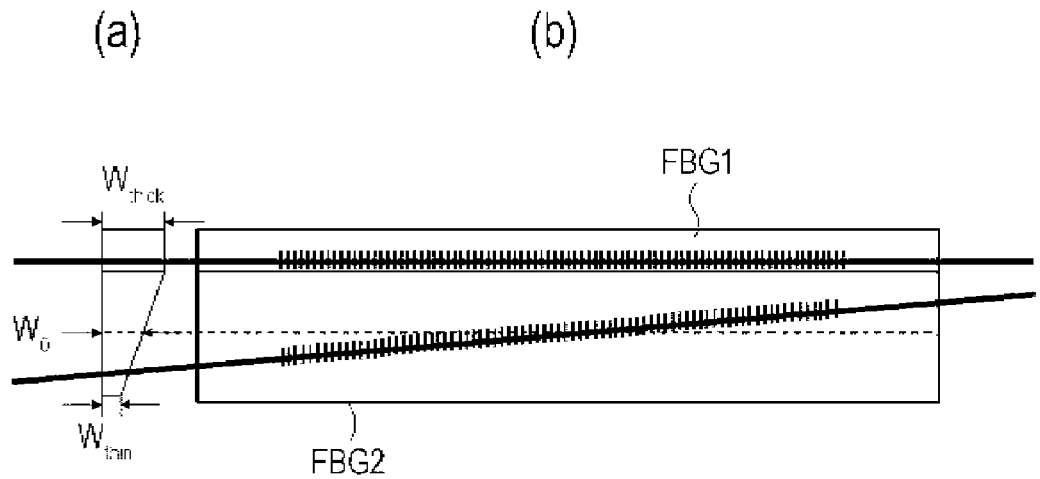
[Fig. 4]
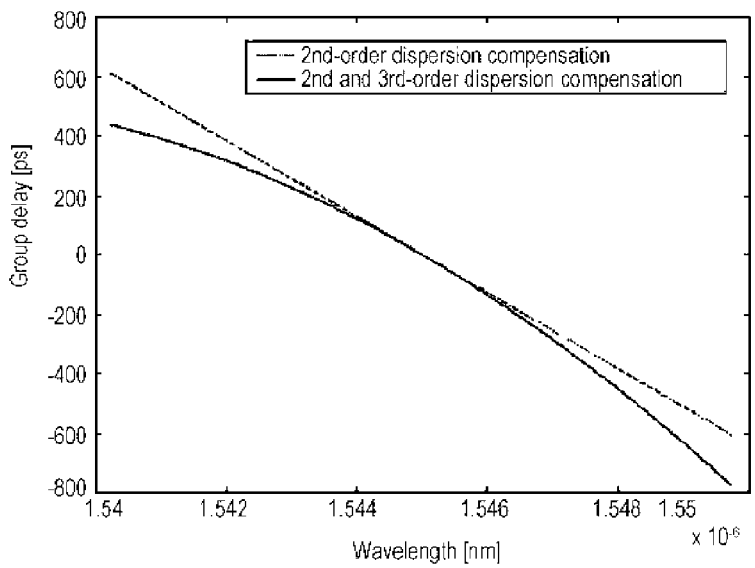
[Fig. 5]
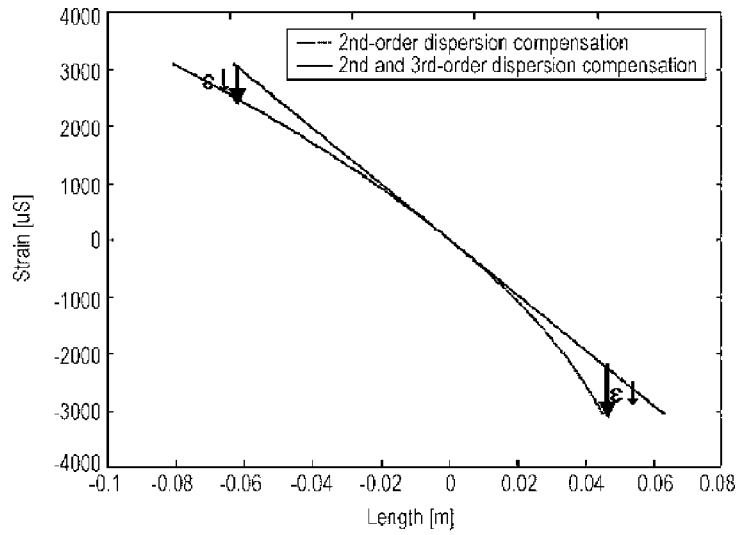

[Fig. 6]
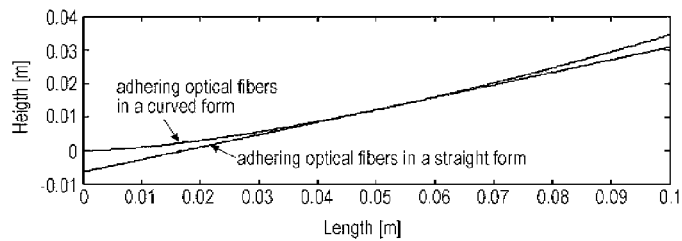
[Fig. 7]
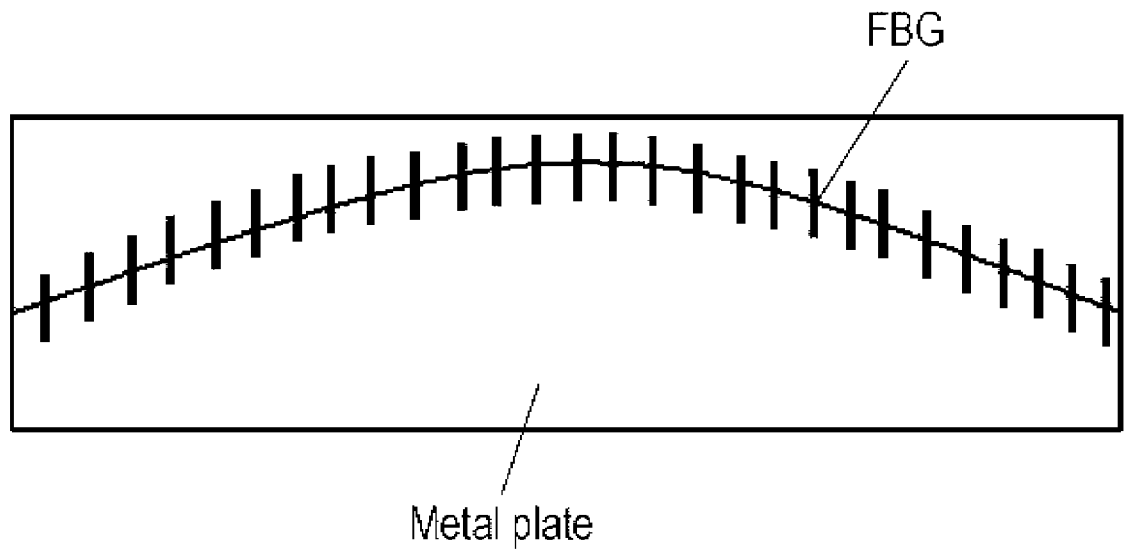
[Fig. 8]
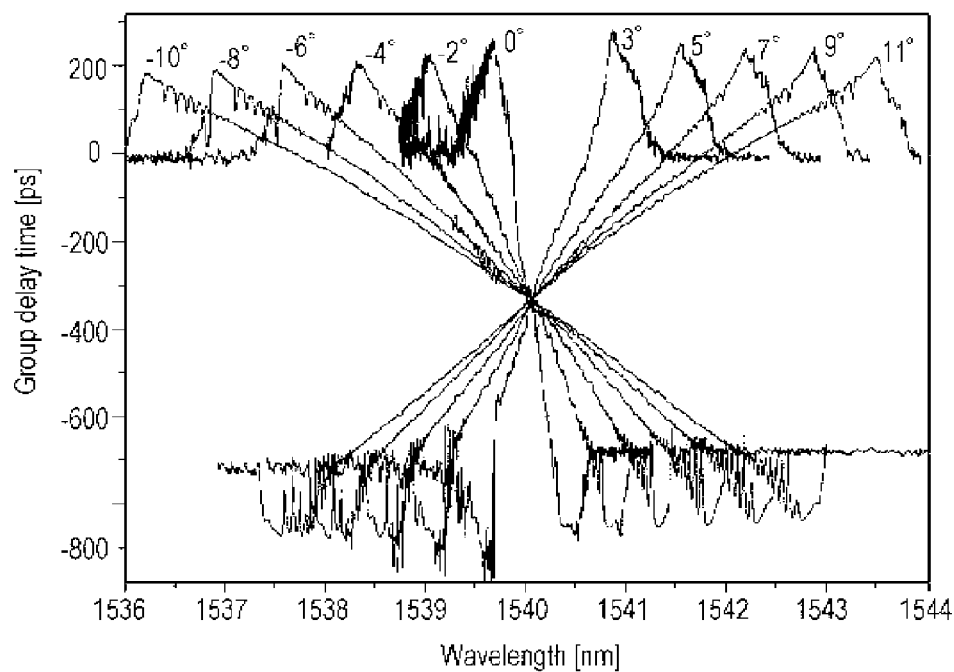

TUNABLE DISPERSION AND DISPERSION SLOPE COMPENSATOR IN OPTICAL TELECOMMUNICATION SYSTEM

TECHNICAL FIELD

The present invention relates to a dispersion and dispersion slope compensator in an optical communication system, and more particularly to a dispersion and dispersion slope compensator based on an optical fiber grating.

BACKGROUND ART

Optical communication technology has been rapidly improving over the years due to the development of optical fiber technologies and light sources such as semi-conductor lasers. In particular, the wavelength division multiplexing, in which optical signals having different wavelengths are transmitted through a single optical fiber, has been established as a key technology in optical communication. Further, the Erbium-doped fiber amplifier (EDFA) has been recently developed to resolve the problem of energy loss in optical signals, which is caused by long distance transmission.

In the technical field of optical communication, a wavelength band ranging from 1,530 to 1.565 nm is commonly employed. In cases where optical signals in the wavelength band are multiplexed and transmitted through a single optical fiber, each of the optical signals has a different refraction index with respect to each wavelength. The different refractive indices to the optical fibers, which depend on the wavelength, cause a dispersion effect. That is, as the transmission distance becomes farther, the optical signals transmitted through the single optical fiber spread out along the time axis. Also, as the transmission distance becomes farther, the dispersion of the optical signals becomes even more prominent to the degree that the transmitted optical signals overlap each other. Thus, it is difficult to discriminate the optical signals at the receiving end of the optical transmission system. As such, the influence of the dispersion slope increases.

A tunable dispersion compensator adopting an optical fiber grating has been mainly used to compensate for the dispersion of these optical signals. Such dispersion compensator facilitates the connection to an optical cable, provides low transmission loss, and does not produce any nonlinear phenomenon of the optical signals. Generally, an optical signal having a central wavelength $\lambda_1$ comprises the central wavelength and a plurality of wavelengths within a range (i.e., $\lambda_1 \pm \delta$ nm) spreading from the central wavelength $\lambda_1$. In such a case, it is known that the longest wavelength (i.e., $\lambda_1 + \delta$ nm) of the optical signals causes the most severe dispersion along the time axis as the transmission distance becomes longer. This is due to a slower transmission rate than other wavelengths. On the other hand, the smallest wavelength (i.e., $\lambda_1 - \delta$ nm) of the optical signals causes a lower dispersion even though the transmission distance becomes longer due to a transmission rate that is more rapid than other wavelengths. Consequently, in order to compensate for the dispersion of the longest wavelength (i.e., $\lambda_1 + \delta$ nm) of the optical signal pulses, it may be desirable to reduce the reflection path in the optical fiber grating. In order to compensate the dispersion of the shortest wavelength (i.e., $\lambda_1 - \delta$ nm), however, it may be preferable to extend the reflection path in the optical fiber grating. This is to compensate the dispersion of the optical signal pulses caused by the long distance transmission.

Generally, the methods of controlling the variable dispersion and dispersion slope of a compensator based on an optical fiber grating may be classified into two methods. According to the first method, the optical fiber grating is divided into several or dozens of sections. Further, the refractive index of the grating is changed by heating and cooling each section at a different temperature in order to adjust the dispersion value. According to the second method, an optical fiber grating is adhered to a surface of a metal plate. In said method, the metal plate is bent to change the period of the grating and the dispersion of the optical signal is adjusted due to the changed period. However, in the first method, the variation of refractive index of the grating in each section becomes discontinuous due to the repeated heating and cooling. Further, unexpected variations of refractive indices on adjacent sections may occur due to heat conduction. Thus, the performance of the tunable dispersion compensator becomes degraded.

A bending process is performed in the second method. More specifically, one end of the metal plate, to which the optical fiber grating is adhered, becomes fixed, while the other end of the metal plate is moved so that the metal plate can be bent. Therefore, the period of the optical fiber grating may vary due to the tensile force and contractile force induced by bending the metal plate. In other words, the dispersion is compensated when the periods of the optical fiber grating become longer upon the inducement of the tensile force, while the period of the optical fiber grating becomes shorter upon the inducement of the contractile force. As such, the dispersion value, which is defined as a variation of the group delay time of wavelengths of the optical signals, can be therefore adjusted by varying the periods of the optical fiber grating. However, it is difficult to linearly control the dispersion and the control is bound to a fixed range.

DISCLOSURE OF INVENTION

Technical Problem

In order to solve the above-mentioned problems, a tunable dispersion and dispersion slope compensator is provided to easily control the dispersion compensation.

Technical Solution

According to a preferred embodiment of the present invention, there is provided a tunable dispersion and dispersion slope compensator based on an optical fiber grating, comprising: a first disk having a ring shape, wherein the first disk is configured to rotate; a second disk installed at an inner space of the first disk, wherein the second disk is configured not to rotate; a metal plate configured to bend as the first disk rotates; and an optical fiber grating adhered to the metal plate, wherein the optical fiber grating has different strains according to positions when the metal plate rotates.

Advantageous Effects

The tensile and contractile forces induced on the optical grating due to the rotation of an outer disk in a tunable dispersion compensator based on the optical grating can be changed to control the dispersion and dispersion slope. In particular, different strains can be applied to the optical fiber grating as the position of the grating varied due to the metal plate, to which the optical fiber grating is adhered, not having thickness uniformity or due to the optical fiber grating adhered to the uniform metal plate in a curved form.

BRIEF DESCRIPTION OF THE DRAWINGS

FIG. 1 is a diagram illustrating a tensile force and a contractile force induced by bending a metal plate.

FIG. 2 is a schematic diagram of a tunable dispersion compensator constructed in accordance with an embodiment of the present invention.

FIG. 3 is a schematic diagram showing an optical grating on a metal plate having non-uniform thickness constructed in accordance with an embodiment of the present invention.

FIG. 4 is a graph showing the group delay versus the wavelength.

FIG. 5 is a graph showing the variation of the strain versus the length of the metal plate.

FIG. 6 is a graph showing optical fiber gratings adhered to the metal plate having non-uniform thickness to form a straight line and a curved line.

FIG. 7 is a plane view showing optical fiber gratings adhered to the metal plate having non-uniform thickness to form a curved line.

FIG. 8 is a graph showing a reflection spectrum of optical fiber grating measured with the tunable dispersion compensator shown in FIG. 2.

BEST MODE FOR CARRYING OUT THE INVENTION

The preferred embodiment of the present invention is described in detail with reference to FIGS. 1 to 8.

FIG. 1 shows a tensile force and a contractile force induced on a metal plate when the metal plate is bent. To explain the tensile and contractile forces, it should be assumed that the metal plate is located on a circle having radius R. After adhering the optical fiber grating of the metal plate, if the metal plate is bent, then a strain expressed as below is induced.

$$\varepsilon(l) = \frac{W(l)}{2} \cdot \frac{d\phi}{dl} = \frac{W(l)}{2} \cdot \frac{1}{R(l)} = \frac{1}{2}\left(W_0 + \frac{\partial w}{\partial l} \cdot l\right) \cdot \frac{1}{R(l)} \qquad \text{MathFigure 1}$$

In math FIG. 1, 'w(l)' denotes the thickness of the metal plate which varies according to the length of the metal plate, 'R' denotes the radius, 'φ' denotes the angle of the curved surface, '$W_o$' denotes the thickness of the metal plate at the center of the length, and '∂w/∂l' denotes the variation of the thickness of the metal plate with respect to reference '$W_o$'. Referring to math FIG. 1, the strain varies due to the variation in plate thickness 'W(l)/2' and the radius '1/R(l)'.

The strain, which depends on the length 'l' can be expressed as math FIG. 2 as below, when the tensile and contractile forces are symmetrically induced on the metal plate with respect to the center of the grating.

$$\varepsilon(l) = \frac{\varepsilon_M}{L} \cdot l \qquad \text{MathFigure 2}$$

In math FIG. 2, '$\epsilon_M$' denotes the tensile force induced on optical fiber grating (FBG) at both ends and 'L' denotes the distance from the center to the symmetric axis. The strength of the tensile force induced on the optical fiber grating at the ends can be approximated with respect to the rotation angle θ as shown in math FIG. 3.

$$\varepsilon_M(\theta) \cong \frac{3W(l)}{L} \cdot \theta \qquad \text{MathFigure 3}$$

The term $\epsilon_M$ can be removed by substituting math FIG. 3 for math FIG. 2, wherein math FIG. 4 can be obtained.

$$\varepsilon(l) = \frac{1}{2}\left(W_0 + \frac{\partial w}{\partial l} \cdot l\right) \cdot \frac{2\varepsilon_M}{W(l)L} \cdot l \cong \left(W_0 + \frac{\partial w}{\partial l} \cdot l\right) \cdot \frac{3}{L^2} \cdot \theta \cdot l \qquad \text{MathFigure 4}$$

$$= \left(\frac{3W_0}{L^2} \cdot \theta\right) l + \left(\frac{\partial w}{\partial l} \cdot \frac{3\theta}{L^2}\right) \cdot l^2$$

As shown in math FIG. 4, the strain can be controlled linearly or non-linearly with respect to the length 'l' by changing the thickness of the metal plate and the rotation angle. Further, the dispersion and the dispersion slope cannot be controlled and be compensated linearly or non-linearly. FIG. 2 is a schematic diagram illustrating a tunable dispersion compensator in accordance with the preferred embodiment of the present invention. As shown in FIG. 2, the tunable dispersion compensator 10 includes a ring-shaped outer disk 1 (capable of rotating), an inner disk 2 surrounded by the outer disk 1 (not capable of rotating), an optical fiber grating 6a, a metal plate 6 (to which the optical fiber grating is adhered), and first and second metal plate holders 5a and 5b for adhering the metal plate 6b to the outer and inner disks 1 and 2. The first and second metal plate holders 5a and 5b have rotation axes 4a and 4b as well as fixation axes 3a and 3b. The rotation axes 4a and 4b are connected to the outer disk 1 and moved according to the rotation of the outer disk 1, while the fixation axes 3a and 3b are connected to the inner disk 2 and not moved according to the rotation of the outer disk 1. The rotation axes 3a and 3b and the fixation axes 4a and 4b are not diametrically opposite to each other. The metal plate 6 is bent to have a substantially asymmetric bending curve with respect to the center when the outer disk 1 rotates.

The outer disk 1 is a ring-shaped rotating circle. Further, the inner disk 2 is installed by using an axis (not shown) located inside of the outer disk 1 so as not to be moved even if the ring-shaped outer disk 1 rotates. Also, the centers of the outer disk 1 and the inner disk 2 are located at the center of the metal plate 6b to which the optical fiber gratings 6a are adhered.

The distances from the center of the metal plate 6b to the rotation axes 4a and 4b of the first and second metal plate holders 5a and 5b may be expressed as (+)L and (−)L, respectively. Both ends of the metal plate 6b are coupled to the outer disk 1 through the rotation axes 4a and 4b. The fixation axes 3a and 3b are located at positions that are apart from the center of the metal plate 6b by distances (+)2L/3 and (−)2L/3, respectively. The real length of the metal plate 6b, which is expressed by (+)L and (−) L in FIG. 2, is 2L. The length of the optical fiber grating 6a adhered to the metal plate 6b is shorter than that of the metal plate 6b.

The outer disk 1 may be rotated clockwise or counterclockwise. FIG. 2 shows that the outer disk 1 rotates in a counterclockwise direction. If the outer disk 1 rotates in a counterclockwise direction, as shown in FIG. 2, the rotation axes 4a and 4b of the first and second metal plate holders 5a and 5b coupled to the outer disk 1 move along the rotation direction of the outer disk 1. However, the fixation axes 3a and 3b of the first and second metal plate holders 5a and 5b coupled to the inner disk 2 do not move. Thus, the metal plate 6b becomes bent and the periods of the optical fiber grating 6a adhered to the metal plate 6b are changed. As a result, the dispersion and dispersion slope of the optical signal can be compensated by adjusting the reflective path of wavelengths of the optical signals inputted to the optical fiber grating 6a.

The metal plate 6b, which is limited by the rotation axes 4a and 4b of the first and second metal plate holders 5a and 5b located at positions distanced (+)L and (−)L from the center of the metal plate 6b, respectively, provides symmetric tensile force and contractile force with respect to the center of the metal plate 6b. Thus, the rotation of the outer disk 1 provides linear delay time to the optical fiber grating 6a, which are positioned between the distance (+)L and (−)L from the center of the metal plate 6b. Also, the rotation of the metal plate 6b finely adjusts the delay time of the wavelengths of the optical signals inputted to the optical fiber grating 6a so that the dispersion and dispersion slope of the optical signals are compensated. Further, the thickness of the metal plate is adjusted to induce asymmetric tensile force and contractile force. Thus, not only the dispersion but also the dispersion slope can be controlled non-linearly.

Further, when the outer disk 1 rotates, the rotation axes 4a and 4b of the first and second metal plate holders 5a and 5b move with a same angle to the center of the outer disk 1, tensile force and contractile force symmetric to each other with respect to the center of the optical fiber grating. Consequently, a shift of a central wavelength of the optical signals inputted to the optical fiber grating 6a can be suppressed. This is because the tensile force and the contractile force are counterbalanced at the center of the optical fiber grating 6a.

The compensator of the present invention controls the strain of the optical fiber grating. This is so that the optical fiber grating can have a non-linear group delay to the wavelengths.

The thickness of the metal plate according to an embodiment of the present invention varies in the direction of the length of the metal plate and in the direction perpendicular to the metal plate, as shown in FIG. 3(A). That is, the thickness increases or decreases in the directions. FIG. 3(B) shows the optical fiber grating (FBG1) adhered to the metal plate in the direction of the length of the optical fiber grating having an uniform thickness. Further, the optical fiber grating (FBG2) is adhered to the metal plate in the direction of the length of the optical fiber grating so as to form a metal plate that lacks the uniformity in thickness. The optical fiber grating (FBG2) adhered to the metal plate, which lacks the uniformity in thickness, has a strain in a curved form and not in a straight form (see FIGS. 4 and 5). Thus, the strain can be controlled more effectively). The thickness of the metal plate can be the height perpendicular to the length of the metal plate.

FIG. 6 shows that the optical fiber grating adhered to the metal plate, which lacks the uniformity in thickness, is in a straight form and in a curved form for comparison.

It is preferred that the metal plate, to which the optical fiber grating is adhered, is formed of a material having a high modulus of elasticity and a force of restitution. Also, it is preferred to form the metal plate by using a material that does not lower the performance under the repeated mechanical variation. Preferably, the metal plate is formed to a thickness of several mille-meters (mm). In the preferred embodiment of the present invention, a spring steel of 15 cm (length)×3 cm (width) may be preferably used as the metal plate 6b. The thickness of the metal plate is not uniform in the direction perpendicular to the length of the optical fiber grating. The thickness of the metal plate can be increased or decreased in the direction of the length of the optical fiber grating by obliquely adhering the optical fiber grating. The center of the metal plate may have a thickness of 0.2 mm.

In particular, the strain induced on the optical fiber grating can be expressed as the following math FIG. 5, when the length direction (bending direction) of the metal plate and optical fiber grating form an angle θ at the length, displacement l.

$$\varepsilon(l) = \sqrt{1 + 2\varepsilon(l)\cos'(\theta) + \varepsilon'(l)\cos'(\theta)} - 1 \cong \cos(\theta) \cdot \varepsilon(l) \quad \text{MathFigure 5}$$

While using the math FIG. 5, when the thickness of the metal plate is uniform, the strain can be effectively controlled by adjusting the angle between the optical fiber grating (FBG) and the metal plate and adhering the FBG to the metal plate in a curved form as shown in FIG. 7

Mode for the Invention

For the convenience of explanation, an optical fiber grating is adhered to the metal plate in the preferred embodiment of the present invention. However it should be noted that a plurality of optical fiber gratings can be adhered to the metal plate and used to implement the present invention. FIG. 8 shows a spectra of the dispersion slope of the optical fiber grating, which is measured by Optical Network Analyzer, Q7750 OPTSCOPE, provided by ADVENTEST company, while rotating the ring of the tunable dispersion compensator at an angle ranging from (−) 10° to (+) 11°. As can be seen from the measured results, the dispersion slope of the optical fiber grating can be controlled within the expanded range from (−)141.6 to (+)148.1 [ps/nm] by using the tunable dispersion compensator of the present invention.

While the present invention has been shown and described with respect to particular embodiments, it will be apparent to those skilled in the art that many changes and modifications may be made without departing from the spirit and scope of the invention as defined in the appended claims.

INDUSTRIAL APPLICABILITY

As a result, the delay time of the wavelengths of the optical signal inputted to the optical fiber grating can be precisely controlled, and the shift of the central wavelength is by suppressed to compensate for the dispersion of the optical signal. Also, the dispersion compensation of the tunable dispersion compensator can be easily controlled only with the rotation of the outer disk, and the dispersion and dispersion slope of the optical fiber grating can be continuously controlled. That is, non-linear chirping rate can be obtained on the periods of gratings by inducing the non-linear tensile and contractile forces on the optical fiber grating adhered to the metal plate having a non-uniform thickness. Thus, it is possible to control the dispersion and dispersion slope differently according to the position of the adhered optical fiber grating. Further, the optical fiber gratings are adhered to have an angle with respect to the length direction of the metal plate. Therefore, the dispersion and the dispersion slope can be controlled linearly or non-linearly.

The invention claimed is:

1. A tunable dispersion and dispersion slope compensator, comprising:
    a first disk having a ring shape, wherein the first disk is configured to rotate;
    a second disk installed at an inner space of the first disk, wherein the second disk is configured not to rotate;
    a metal plate configured to bend as the first disk rotates, wherein the metal plate has non-uniform thickness;
    a plurality of optical fiber gratings adhered to the metal plate, wherein the optical fiber gratings form an oblique line, and the optical fiber gratings have different strains according to positions when the metal plate rotates; and a first holder and a second holder for fixing the metal plate, wherein each of the first and the second holders includes a first axis for coupling a part of each holder to the first disk and a second axis for coupling another part of each holder to the second disk, wherein the first axis of each holder is moved with a same angle to the center of the first disk when the first disk rotates, wherein the first axes of the first and the second holders are not diametrically opposite to each other, and wherein the metal plate is bent to have an asymmetric bending curve with respect to the center when the first disk rotates.

2. A tunable dispersion and dispersion slope compensator, comprising:
- a first disk having a ring shape, wherein the first disk is configured to rotate;
- a second disk installed at an inner space of the first disk, wherein the second disk is configured not to rotate;
- a metal plate configured to bend as the first disk rotates, wherein the metal plate has non-uniform thickness;
- a plurality of optical fiber gratings adhered to the metal plate, wherein the optical fiber gratings form an oblique line, and the optical fiber gratings have different strains according to positions when the metal plate rotates; and
- a first holder and a second holder for fixing the metal plate, wherein each of the first and the second holders includes a first axis for coupling a part of each holder to the first disk and a second axis for coupling another part of each holder to the second disk, wherein the first axis of each holder is moved with a same angle to the center of the first disk when the first disk rotates, wherein the second axes of the first and the second holders are not diametrically opposite to each other, and wherein the metal plate is bent to have an asymmetric bending curve with respect to the center when the first disk rotates.

3. A tunable dispersion and dispersion slope compensator, comprising:
- a first disk having a ring shape, wherein the first disk is configured to rotate;
- a second disk installed at an inner space of the first disk, wherein the second disk is configured not to rotate;
- a metal plate configured to bend as the first disk rotates, wherein the metal plate has non-uniform thickness;
- a plurality of optical fiber gratings adhered to the metal plate, wherein the optical fiber gratings form an oblique line, and the optical fiber gratings have different strains according to positions when the metal plate rotates; and
- a first holder and a second holder for fixing the metal plate, wherein each of the first and the second holders includes a first axis for coupling a part of each holder to the first disk and a second axis for coupling another part of each holder to the second disk, wherein the first axis of each holder is moved with a same angle to the center of the first disk when the first disk rotates, wherein the first and second axes of each of the first and the second holders are not diametrically opposite to each other, and wherein the metal plate is bent to have an asymmetric bending curve with respect to the center when the first disk rotates.

* * * * *